(12) United States Patent
Minami

(10) Patent No.: US 12,725,779 B2
(45) Date of Patent: Sep. 1, 2026

(54) ELECTRODE FOR ALL-SOLID-STATE BATTERY, ALL-SOLID-STATE BATTERY, AND METHOD OF PRODUCING ELECTRODE FOR ALL-SOLID-STATE BATTERY

(71) Applicant: TOYOTA JIDOSHA KABUSHIKI KAISHA, Toyota (JP)

(72) Inventor: Keiichi Minami, Tagata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 539 days.

(21) Appl. No.: 18/374,707

(22) Filed: Sep. 29, 2023

(65) Prior Publication Data

US 2024/0128433 A1 Apr. 18, 2024

(30) Foreign Application Priority Data

Oct. 17, 2022 (JP) ................................ 2022-166066

(51) Int. Cl.
*H01M 4/04* (2006.01)
*H01M 4/02* (2006.01)
*H01M 4/139* (2010.01)
*H01M 4/62* (2006.01)

(52) U.S. Cl.
CPC ........... *H01M 4/043* (2013.01); *H01M 4/139* (2013.01); *H01M 4/62* (2013.01); *H01M 2004/021* (2013.01)

(58) Field of Classification Search
CPC ........ H01M 4/043; H01M 4/139; H01M 4/62; H01M 2004/021; H01M 2300/0068; H01M 10/0562; H01M 4/13; H01M 4/04; H01M 10/0525; Y02E 60/10
See application file for complete search history.

(56) References Cited

U.S. PATENT DOCUMENTS

2017/0250403 A1 8/2017 Iwasaki

FOREIGN PATENT DOCUMENTS

| | | | |
|---|---|---|---|
| JP | 2011-154900 | A | 8/2011 |
| JP | 2014-022204 | A | 2/2014 |
| JP | 2015-005398 | A | 1/2015 |
| JP | 2017-152348 | A | 8/2017 |
| JP | 2021-131979 | A | 9/2021 |
| JP | 2021-144924 | A | 9/2021 |
| JP | 2021-150063 | A | 9/2021 |
| WO | 2020/203367 | A1 | 10/2020 |

*Primary Examiner* — Helen Oi K Conley

(74) *Attorney, Agent, or Firm* — Dinsmore & Shohl LLP

(57) ABSTRACT

An electrode for an all-solid-state battery comprises an active material layer. The active material layer includes an active material, a first solid electrolyte, and a second solid electrolyte. The active material, the first solid electrolyte, and the second solid electrolyte satisfy a relationship of the following expression (1) "$G_2<G_1<G_A$". $G_A$ represents a compressive elastic modulus of the active material. $G_1$ represents a compressive elastic modulus of the first solid electrolyte. $G_2$ represents a compressive elastic modulus of the second solid electrolyte. Further, the active material and the first solid electrolyte satisfy a relationship of the following expression (2) "$0.41r_A<r_1$". $r_A$ represents a particle radius of the active material. $r_1$ represents a particle radius of the first solid electrolyte.

7 Claims, 5 Drawing Sheets

START
a
FORM ACTIVE MATERIAL LAYER
b
COMPRESS
c
ASSEMBLE
END

ELECTRODE FOR ALL-SOLID-STATE BATTERY, ALL-SOLID-STATE BATTERY, AND METHOD OF PRODUCING ELECTRODE FOR ALL-SOLID-STATE BATTERY

CROSS REFERENCE TO RELATED APPLICATIONS

This nonprovisional application is based on Japanese Patent Application No. 2022-166066 filed on Oct. 17, 2022, with the Japan Patent Office, the entire contents of which are hereby incorporated by reference.

BACKGROUND

Field

The present disclosure relates to an electrode for an all-solid-state battery, an all-solid-state battery, and a method of producing an electrode for an all-solid-state battery.

Description of the Background Art

Japanese Patent Laying-Open No. 2017-152348 discloses plastic deformation treatment of solid electrolyte.

SUMMARY

An electrode for an all-solid-state battery (which may also be simply called "an electrode" hereinafter) includes an active material layer. In the active material layer, a solid electrolyte forms an ion conduction path(s). An object of the present disclosure is to form an ion conduction path(s) that is connected three-dimensionally within an active material layer.

Hereinafter, the technical configuration and effects of the present disclosure will be described. It should be noted that the action mechanism according to the present specification includes presumption. The action mechanism does not limit the technical scope of the present disclosure.

1. An electrode for an all-solid-state battery comprises an active material layer. The active material layer includes an active material, a first solid electrolyte, and a second solid electrolyte. The active material, the first solid electrolyte, and the second solid electrolyte satisfy a relationship of the following expression (1):

$$G_2 < G_1 < G_A \quad (1)$$

where $G_A$ represents a compressive elastic modulus of the active material, $G_1$ represents a compressive elastic modulus of the first solid electrolyte, and $G_2$ represents a compressive elastic modulus of the second solid electrolyte.

Further, the active material and the first solid electrolyte satisfy a relationship of the following expression (2):

$$0.41 r_A < r_1 \quad (2)$$

where $r_A$ represents a particle radius of the active material, and $r_1$ represents a particle radius of the first solid electrolyte.

Usually, an active material layer includes one type of solid electrolyte. During the process of electrode production, the active material layer is compressed. Generally, the compressive elastic modulus of the solid electrolyte is less than the compressive elastic modulus of the active material. Because of this, at the time when the active material layer is compressed, the solid electrolyte tends to collapse between active materials. When the solid electrolyte thus collapses between active materials, an ion conduction path(s) can be cut. Further, connection of the ion conduction path(s) can become one-dimensional (linear). As a result, bending of the ion conduction path(s) may increase. When the degree of bending is high, intrinsic properties of the materials (ionic conductivity of the solid electrolyte, specific capacity of the active material) may not be exhibited.

The active material layer according to "1" above includes two types of solid electrolyte with different compressive elastic moduli. The active material layer includes the first solid electrolyte having a relatively high compressive elastic modulus (hard material) and the second solid electrolyte having a relatively low compressive elastic modulus (soft material). In other words, the relationship of the above expression (1) is satisfied. At the time when the active material layer is compressed, the hard material may deform elastically, and thereby may maintain its shape without collapsing. In other words, the hard material may function as a main stem of an ion conduction path(s).

On the other hand, the soft material may deform plastically, and thereby may fill voids. At this time, when the relationship of the above expression (2) is satisfied, voids may be formed between active materials. The voids between active materials may be filled with the soft material, and thereby an ion conduction path(s) may be formed. The ion conduction path(s) thus formed by the soft material may connect with the ion conduction path(s) formed by the hard material (the main stem part). The ion conduction path(s) formed by the soft material may extend like branches from the main stem. That is, an ion conduction path(s) that is connected three-dimensionally and has a thick main stem may be formed. As a result, bending of the ion conduction path(s) is expected to be decreased.

2. In the electrode for an all-solid-state battery according to "1" above, the active material and the first solid electrolyte may further satisfy a relationship of the following expression (3), for example.

$$r_1 \leq 0.83 r_A \quad (3)$$

When the relationship of the above expression (3) is satisfied, the balance between the volume occupancy of the active material in the active material layer and the thickness of the first solid electrolyte (a main-stem-like ion conduction path(s)) tends to be good. With the improved balance between the volume occupancy of the active material and the thickness of the first solid electrolyte, high capacity and high power output are both expected to be obtained, for example.

3. In the electrode for an all-solid-state battery according to "1" or "2" above, the active material and the second solid electrolyte may further satisfy a relationship of the following expression (4), for example:

$$0 < r_2 \leq 0.29 r_A \quad (4)$$

where $r_A$ represents a particle radius of the active material, and $r_2$ represents a particle radius of the second solid electrolyte.

When the relationship of the above expression (4) is satisfied, the balance between the volume occupancy of the active material in the active material layer and the continuity of the second solid electrolyte (a branch-like ion conduction path(s)) tends to be good. With the improved balance between the volume occupancy of the active material and the continuity of the second solid electrolyte, high capacity and high power output are both expected to be obtained, for example.

4. In the electrode for an all-solid-state battery according to any one of "1" to "3" above, a volume fraction of the active material in the active material layer may be 60% or more, for example.

In some embodiments, from the viewpoint of volumetric energy density, the volume fraction (space occupancy) of the active material in the active material layer may be as high as possible. However, as the volume fraction of the active material increases, active materials tend to come into contact with each other and the ion conduction path(s) tends to be cut. When the ion conduction path(s) is cut, battery capacity matching the volume fraction of the active material may not be obtained. Further, when the ion conduction path(s) is cut, battery power output may decrease. It would be very beneficial if an ion conduction path(s) is connected three-dimensionally in an active material layer in which the volume fraction of the active material is 60% or more.

5. An all-solid-state battery comprises the electrode for an all-solid-state battery according to any one of "1" to "4" above.

6. A method of producing an electrode for an all-solid-state battery comprises the following (a) and (b):

(a) forming an active material layer including an active material, a first solid electrolyte, and a second solid electrolyte; and (b) compressing the active material layer to produce an electrode for an all-solid-state battery.

The active material, the first solid electrolyte, and the second solid electrolyte satisfy a relationship of the following expression (1):

$$G_2<G_1<G_A \quad (1)$$

where $G_A$ represents a compressive elastic modulus of the active material, $G_1$ represents a compressive elastic modulus of the first solid electrolyte, and $G_2$ represents a compressive elastic modulus of the second solid electrolyte.

In (b) above, compressive stress is generated within the active material layer. The compressive stress is within an elastic region of a stress-strain curve of the first solid electrolyte. Further, the compressive stress is within a plastic region of a stress-strain curve of the second solid electrolyte.

When the relationship of the above expression (1) is satisfied in the active material layer, the active material layer may be compressed in such a manner that the first solid electrolyte (hard material) is deformed elastically and the second solid electrolyte (soft material) is deformed plastically. By this, an ion conduction path(s) that is connected three-dimensionally is expected to be formed.

7. In the method of producing an electrode for an all-solid-state battery according to "6" above, in the active material layer after the compressing, the active material, the first solid electrolyte, and the second solid electrolyte may satisfy relationships of the following expressions (2) to (4):

$$0.41r_A<r_1 \quad (2)$$

$$r_1\leq 0.83r_A \quad (3)$$

$$0<r_2\leq 0.29r_A \quad (4)$$

where $r_A$ represents a particle radius of the active material, $r_1$ represents a particle radius of the first solid electrolyte, and $r_2$ represents a particle radius of the second solid electrolyte.

In the following, an embodiment of the present disclosure (which may also be simply called "the present embodiment" hereinafter) will be described. It should be noted that the present embodiment does not limit the technical scope of the present disclosure. The present embodiment is illustrative in any respect. The present embodiment is non-restrictive. The technical scope of the present disclosure encompasses any modifications within the meaning and the scope equivalent to the terms of the claims. For example, it is originally planned that any configurations of the present embodiment may be optionally combined.

The foregoing and other objects, features, aspects and advantages of the present disclosure will become more apparent from the following detailed description of the present disclosure when taken in conjunction with the accompanying drawings.

DESCRIPTION OF THE EMBODIMENTS

<Terms and Definitions Thereof, Etc.>

Figure 1:
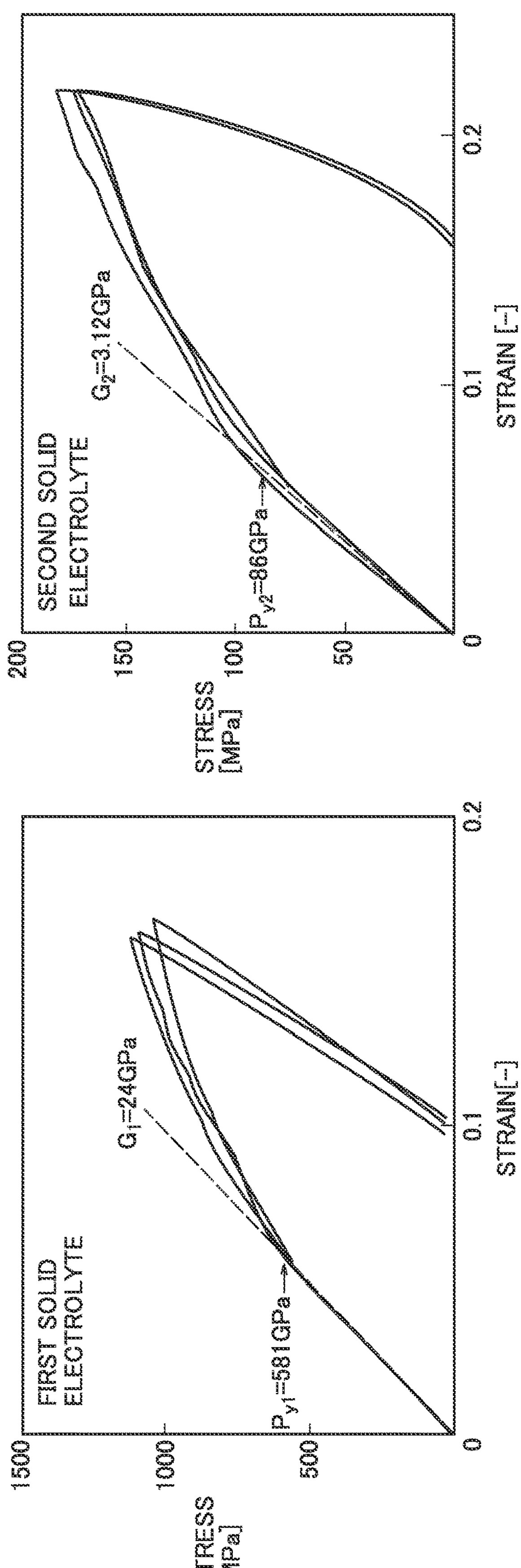
FIG. 1 is an example of stress-strain curve measurement.

Expressions such as "comprise", "include", and "have", and other similar expressions (such as "be composed of", for example) are open-ended expressions. In an open-ended expression, in addition to a component, an additional component may or may not be further included. The expression "consist of" is a closed-end expression. However, even when a closed-end expression is used, impurities present under ordinary circumstances as well as an additional element irrelevant to the technique according to the present disclosure are not excluded. The expression "consist essentially of" is a semiclosed-end expression. A semiclosed-end expression tolerates addition of an element that does not substantially affect the fundamental, novel features of the technique according to the present disclosure.

Expressions such as "may" and "can" are not intended to mean "must" (obligation) but rather mean "there is a possibility" (tolerance).

Any geometric term (such as "parallel", "vertical", and "orthogonal", for example) should not be interpreted solely in its exact meaning. For example, "parallel" may mean a geometric state that is deviated, to some extent, from exact "parallel". Any geometric term herein may include tolerances and/or errors in terms of design, operation, production, and/or the like. The dimensional relationship in each figure may not necessarily coincide with the actual dimensional relationship. The dimensional relationship (in length, width, thickness, and the like) in each figure may have been changed for the purpose of assisting understanding for the readers. Further, a part of a configuration may have been omitted.

A numerical range such as "from m to n %" includes both the upper limit and the lower limit, unless otherwise specified. That is, "from m to n %" means a numerical range of "not less than m % and not more than n %". Moreover, "not less than m % and not more than n %" includes "more than m % and less than n %". Further, any numerical value selected from a certain numerical range may be used as a new upper limit or a new lower limit. For example, any numerical value from a certain numerical range may be combined with any numerical value described in another location of the present specification or in a table or a drawing to set a new numerical range.

All the numerical values are regarded as being modified by the term "about". The term "about" may mean±5%, ±3%, ±1%, and/or the like, for example. Each numerical value may be an approximate value that can vary depending on the implementation configuration of the technique according to the present disclosure. Each numerical value may be expressed in significant figures. Each measured value may be the average value obtained from multiple measurements performed. The number of measurements may be 3 or more, or may be 5 or more, or may be 10 or more. Generally, the greater the number of measurements is, the more reliable the average value is expected to be. Each measured value may be rounded off based on the number of the significant figures. Each measured value may include an error occurring due to an identification limit of the measurement apparatus, for example.

When a compound is represented by a stoichiometric composition formula (such as "$LiCoO_2$", for example), this stoichiometric composition formula is merely a typical example of the compound. The compound may have a non-stoichiometric composition. For example, when lithium cobalt oxide is represented as "$LiCoO_2$", the composition ratio of lithium cobalt oxide is not limited to "Li/Co/O=1/1/2" but Li, Co, and O may be included in any composition ratio, unless otherwise specified. Further, doping with a trace element and/or substitution may also be tolerated.

"Electrode" collectively refers to a positive electrode and a negative electrode. An electrode may be either a positive electrode or a negative electrode.

"Particle radius" is measured in an SEM (Scanning Electron Microscope) image of a cross section of an active material layer. In an SEM image, a group of particles of a measurement target (such as active material, for example) is extracted. The group of particles consists of 100 particles. For each of these 100 particles, the Feret diameter is measured. The Feret diameter refers to the distance between two points located farthest apart from each other on the outline of the cross section of each particle. The arithmetic mean of 100 Feret diameters is determined. The arithmetic mean of the Feret diameters multiplied by 0.5 is regarded as the particle radius.

"Compressive elastic modulus" refers to the value determined by the following procedure. A powder sample (active material, solid electrolyte) is prepared. A pellet-molding die is prepared. The cavity of the die has a diameter of 10 mm. The powder sample in an amount of 100 to 200 mg is filled into the cavity. Pressing is performed at 6 t (58.8 kN) to form a pellet sample. The resulting pellet sample is set into a nanoindentation tester. A first indenter is used to locally compact the pellet sample to form a region for measurement (a measurement region). The compacting conditions are as follows:

First indenter: spherical, with a diameter of 100 μm

Maximum load: 12 N

Maximum displacement: 100 μm

For the measurement region, a stress-strain curve is obtained by measurement by an indentation method. For the measurement of the stress-strain curve, a second indenter (spherical, with a diameter of 4 μm) is used. On the stress-strain curve, the slope of the elastic region is identified. The slope of the elastic region is measured three times. The arithmetic mean of these three measurements of the slope is regarded as "the compressive elastic modulus".

FIG. 1 is an example of stress-strain curve measurement. The horizontal axis of the graph indicates strain (c). The strain is determined by the equation "$\varepsilon=(h/R)^{0.5}$". h represents displacement (the amount of pressed-in). R represents the radius of the indenter. The vertical axis of the graph indicates stress (σ). The stress is equal to contact pressure ($P_m$). The contact pressure is determined by "$P_m=P/(\pi Rh)$". P represents load. π represents the circular constant. R represents the radius of the indenter. h represents displacement.

<All-Solid-State Battery>

Figure 2:
FIG. 2 is a conceptual view of an example of an all-solid-state battery according to the present embodiment.
Figure 2:
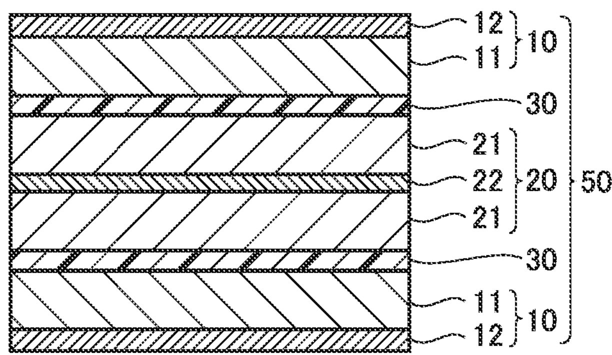
Figure 2:
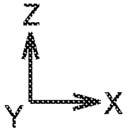

FIG. 2 is a conceptual view of an example of an all-solid-state battery according to the present embodiment. In FIG. 2, a cross section parallel to the thickness direction of a battery 100 is conceptually illustrated. Battery 100 includes a power generation element 50. Battery 100 may include an exterior package (not illustrated), for example. The exterior package may accommodate power generation element 50. The exterior package may be a pouch made of a metal foil laminated film, a case made of metal, and/or the like, for example. Battery 100 may include a single power generation element 50, or may include a plurality of power generation elements 50. The plurality of power generation elements 50 may form a series circuit, or may form a parallel circuit, for example.

Power generation element 50 includes a first electrode 10, a separator layer 30, and a second electrode 20. Power generation element 50 may include first electrode 10, separator layer 30, and second electrode 20, each in plurality. As an example, power generation element 50 in FIG. 1 includes two first electrodes 10, two separator layers 30, and one second electrode 20. Separator layer 30 is interposed between first electrode 10 and second electrode 20. Separator layer 30 separates first electrode 10 from second electrode 20. Separator layer 30 may include a solid electrolyte and a binder, for example. The thickness of separator layer 30 may be from 1 to 100 μm, for example.

<<Electrode>>

Second electrode 20 has a polarity that is different from that of first electrode 10. For example, when first electrode 10 is a positive electrode, second electrode 20 is a negative electrode. First electrode 10 includes a first active material layer 11. First electrode 10 may further include a first current collector 12. First active material layer 11 may be formed on only one side of first current collector 12. First active material layer 11 may be formed on both sides of first current collector 12.

Second electrode 20 includes a second active material layer 21. Second electrode 20 may further include a second current collector 22. Second active material layer 21 may be formed on only one side of second current collector 22. Second active material layer 21 may be formed on both sides of second current collector 22. Each of first current collector 12 and second current collector 22, independently, may have a thickness from 5 to 50 μm, for example. Each of first current collector 12 and second current collector 22, independently, may include an Al foil, an Al alloy foil, a Cu foil, a Ni foil, a stainless steel foil, and/or the like, for example. Hereinafter, first active material layer 11 and second active material layer 21 are collectively called "an active material layer".

<<Active Material Layer>>

The active material layer may have a thickness from 1 to 1000 μm, or from 5 to 500 μm, or from 10 to 100 μm, for example. The active material layer includes an active material, a first solid electrolyte, and a second solid electrolyte. The active material layer may further include an electrically-conductive material, a binder, and the like, for example. The active material layer may include, for example, the binder in an amount from 1 to 10%, the electrically-conductive material in an amount from 0 to 10%, the first solid electrolyte in an amount from 1 to 30%, and the second solid electrolyte in an amount from 1 to 30%, in terms of mass fraction, with the remainder being made up of the active material.

The active material, the first solid electrolyte, and the second solid electrolyte satisfy the relationship of the following expression (1). With the relationship of the following expression (1) satisfied, a desirable ion conduction path(s) is expected to be formed.

$$G_2<G_1<G_A \quad (1)$$

$G_A$ represents a compressive elastic modulus of the active material. $G_1$ represents a compressive elastic modulus of the first solid electrolyte. $G_2$ represents a compressive elastic modulus of the second solid electrolyte.

(Active Material)

The active material causes electrode reaction to occur. The active material may be a positive electrode active material. The positive electrode active material may include, for example, at least one selected from the group consisting of $LiCoO_2$, $LiNiO_2$, $LiMnO_2$, $LiMn_2O_4$, $Li(NiCoMn)O_2$, $Li(NiCoAl)O_2$, $Li(NiCoMnAl)O_2$, and $LiFePO_4$. "(NiCoMn)" in "$Li(NiCoMn)O_2$", for example, means that the constituents within the parentheses are collectively regarded as a single unit in the entire composition ratio.

The active material may be a negative electrode active material. The negative electrode active material may include, for example, at least one selected from the group consisting of natural graphite, artificial graphite, soft carbon, hard carbon, Si, $SiO_x$ ($0<x<2$), Si-based alloy, Sn, $SnO_x$ ($0<x<2$), Li, Li-based alloy, and $Li_4Ti_5O_{12}$.

The compressive elastic modulus of the active material is more than that of each of the first solid electrolyte and the second solid electrolyte. The compressive elastic modulus of the active material ($G_A$) may be from 30 to 300 GPa, or from 50 to 500 GPa, or from 50 to 300 GPa, or from 30 to 150 GPa, or from 50 to 100 GPa, for example.

(First Solid Electrolyte, Second Solid Electrolyte)

Each of the first solid electrolyte and the second solid electrolyte is a lithium (Li) ion conductor. The first solid electrolyte may form a thick main-stem-like ion conduction path(s). The compressive elastic modulus of the first solid electrolyte is more than that of the second solid electrolyte. The compressive elastic modulus of the first solid electrolyte ($G_1$) may be from 10 to 30 GPa, or from 20 to 50 GPa, or from 20 to 30 GPa, for example. The second solid electrolyte may form an ion conduction path(s) that extends like branches from the main stem. The compressive elastic modulus of the second solid electrolyte is less than that of the first solid electrolyte. The compressive elastic modulus of the second solid electrolyte ($G_2$) may be from 0.01 to 10 GPa, or from 1 to 20 GPa, or from 1 to 10 GPa, or from 1 to 5 GPa, for example.

The particle radius of the first solid electrolyte may be less than that of the active material. The ratio of the particle radius of the first solid electrolyte to the particle radius of the active material may be from 0.41 to 0.83 (more than 0.41 and not more than 0.83), or from 0.41 to 0.59 (more than 0.41 and not more than 0.59), or from 0.59 to 0.83, for example. The particle radius of the second solid electrolyte may be less than that of the first solid electrolyte. The ratio of the particle radius of the first solid electrolyte to the particle radius of the second solid electrolyte may be from 2.9 to 4.9, for example.

As long as the relationship of the above expression (1) is satisfied, each of the first solid electrolyte and the second solid electrolyte may include any component. The first solid electrolyte may include an inorganic-based Li-ion conductor, for example. The first solid electrolyte may include, for example, at least one selected from the group consisting of sulfide, oxide, nitride, halide, and hydride. The second solid electrolyte may include, for example, at least one selected from the group consisting of inorganic-based Li-ion conductor, molten-salt-based Li-ion conductor, polymer-based Li-ion conductor, and molecular-crystal-based Li-ion conductor.

For example, the second solid electrolyte may have the same composition as the first solid electrolyte. Even with the same composition, if their degrees of crystallinity are different, for example, their compressive elastic moduli can be different. For example, the first solid electrolyte may be crystalline and the second solid electrolyte may be amorphous. For example, the first solid electrolyte may be ceramic and the second solid electrolyte may be glass ceramic (crystallized glass). The degree of crystallinity may be adjusted by changing, for example, the heat treatment temperature and/or the like. For example, the first solid electrolyte may be heat-treated at a higher temperature than for the second solid electrolyte. The first solid electrolyte may be sintered by heat treatment. The second solid electrolyte may be partially crystallized by heat treatment.

Each of the first solid electrolyte and the second solid electrolyte, independently, may include, for example, at least one selected from the group consisting of $LiNbO_3$, $Li_3PO_4$, $LiI—LiBr—Li_3PS_4$, $Li_2S—SiS_2$, $LiI—Li_2S—SiS_2$, $LiI—Li_2S—P_2S_5$, $LiI—Li_2O—Li_2S—P_2S_5$, $LiI—Li_2S—P_2O_5$, $LiI—Li_3PO_4—P_2S_5$, $Li_2S—GeS_2—P_2S_5$, $Li_2S—P_2S_5$, $Li_4P_2S_6$, $Li_7P_3S_{11}$, and $Li_3PS_4$. For example, "$LiI—LiBr—Li_3PS_4$" refers to a sulfide Li-ion conductor that is synthesized by mixing LiI, LiBr, and $Li_3PS_4$ in any molar ratio. The sulfide Li-ion conductor may be synthesized by, for example, a solid phase process, a vapor phase process, or a liquid phase process. For example, the sulfide Li-ion conductor may be synthesized by a mechanochemical method. "$Li_2S—P_2S_5$" includes $Li_3PS_4$. $Li_3PS_4$ may be synthesized by mixing $Li_2S$ and $P_2S_5$ in "$Li_2S/P_2S_5=75/25$ (molar ratio)", for example.

(Other Components)

The electrically-conductive material may form an electron conduction path(s) in the active material layer. The electrically-conductive material may include, for example, at least one selected from the group consisting of acetylene black (AB), vapor grown carbon fiber (VGCF), carbon nanotube (CNT), and graphene flake (GF).

The binder is capable of binding solid materials to each other. The binder may include, for example, at least one selected from the group consisting of styrene-butadiene rubber (SBR), polyvinylidene difluoride (PVDF), and vinylidene difluoride-hexafluoropropylene copolymer (PVDF-HFP).

<<Ion Conduction Path>>

Figure 3:
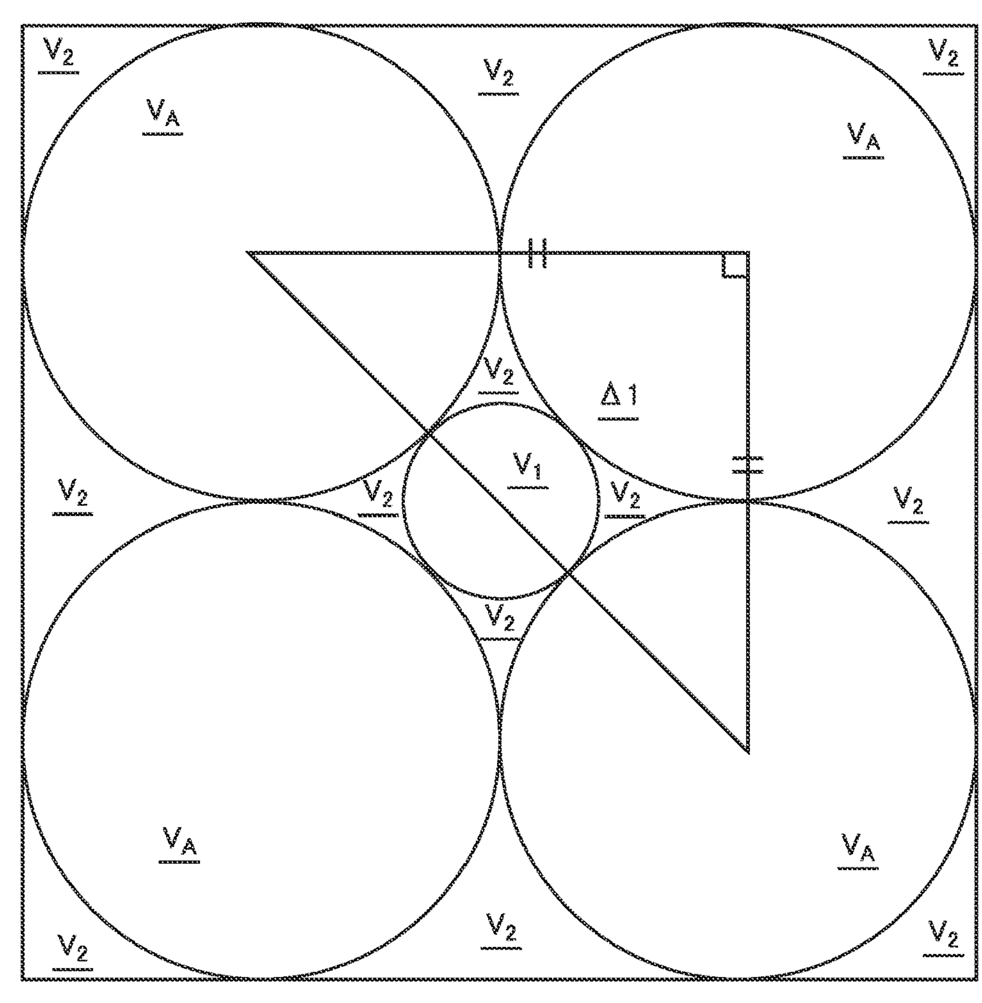
FIG. 3 is a conceptual view of a first packing structure.
Figure 3:
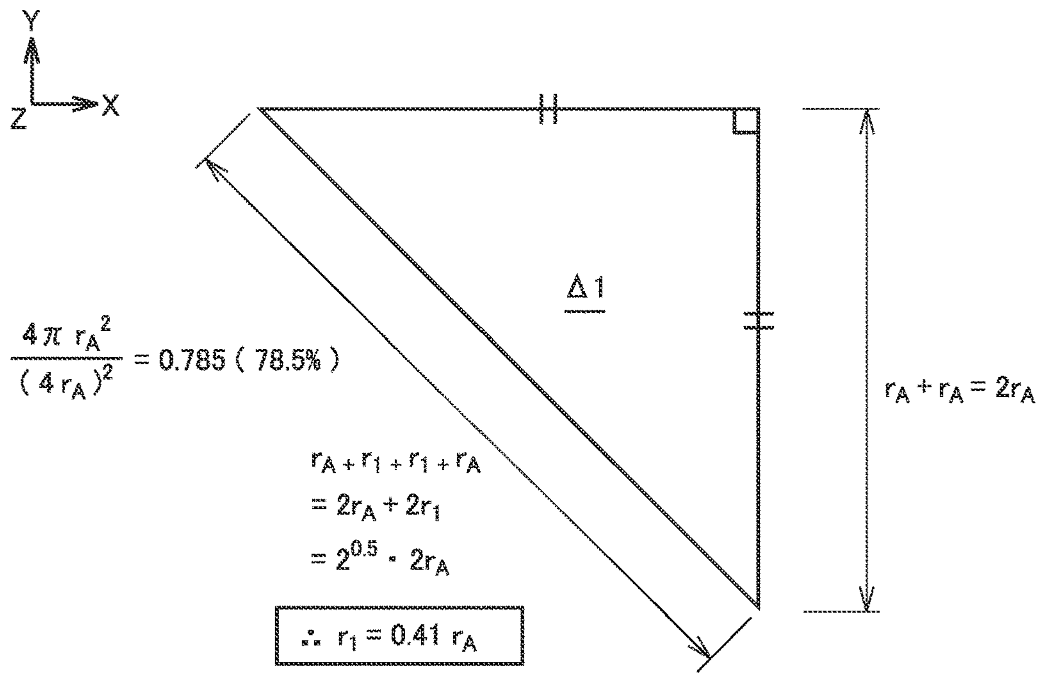
Figure 4:
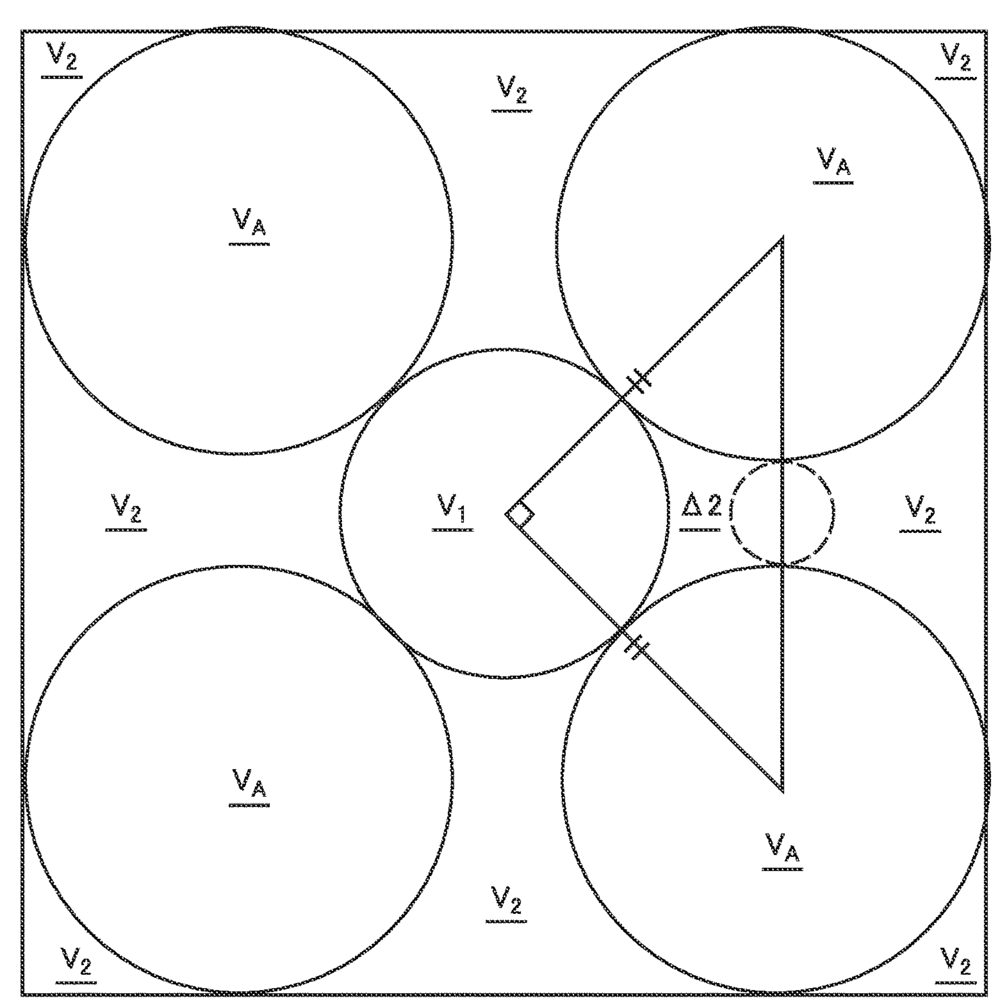
FIG. 4 is a conceptual view of a second packing structure.
Figure 4:
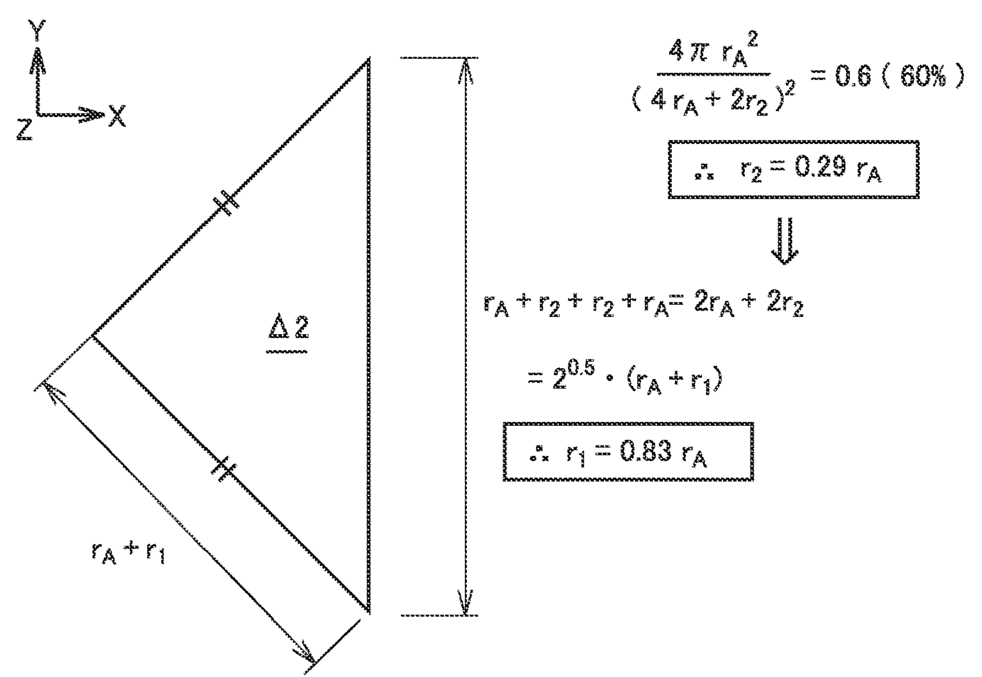

The active material layer includes an ion conduction path(s) that is connected three-dimensionally. In the following, the ion conduction path(s) will be described with reference to a first packing structure (FIG. 3) and a second packing structure (FIG. 4). The present embodiment includes the second packing structure. The present embodiment does not include the first packing structure. The first packing structure is a reference configuration. In FIGS. 3 and 4, $r_A$ represents the particle radius of an active material $V_A$. $r_1$ represents the particle radius of a first solid electrolyte $V_1$. $r_2$ represents the particle radius of a second solid electrolyte $V_2$. The particle radius of active material $V_A$ ($r_A$) may be from 0.1 to 50 μm, or from 0.5 to 10 μm, or from 1 to 5 μm, for example. The particle radius of active material $V_A$ ($r_A$) represents the particle radius of a secondary particle (aggregated primary particles). The particle shapes of active material $V_A$, first solid electrolyte $V_1$, and second solid electrolyte $V_2$ are not limited. In FIGS. 3 and 4, the particles are spherical for the sake of convenience.

(First Packing Structure)

FIG. 3 is a conceptual view of the first packing structure. The first packing structure includes active material $V_A$, first solid electrolyte $V_1$, and second solid electrolyte $V_2$. Active material $V_A$ and first solid electrolyte $V_1$ are in particle form. Although second solid electrolyte $V_2$ is also in particle form, it is illustrated as contiguous phases for the sake of convenience.

First solid electrolyte $V_1$ is contiguous in the Z-axis direction. Active material $V_A$ is packed in the closest manner. More specifically, active material $V_A$ is in contact with each other. At the point where active material $V_A$ is in contact with each other, second solid electrolyte $V_2$ is cut. As a result, the ion conduction path(s) ends up extending one-dimensionally (in a linear fashion).

In the first packing structure, a first isosceles right triangle Δ1 can be drawn. Based on the Pythagorean theorem, first isosceles right triangle Δ1 may satisfy the relationship of the equation "$2^{0.5} \cdot 2r_A = 2r_A + 2r_1$". From this, the relationship of the equation "$0.41r_A = r_1$" may be derived. Hence, when the relationship of the following expression (2) is satisfied, it is conceivable that a void may be formed between active materials $V_A$ into which second solid electrolyte $V_2$ can enter.

$$0.41r_A < r_1 \quad (2)$$

It is conceivable that the area occupancy of active material $V_A$ in FIG. 3 represents the volume fraction of active material $V_A$ in the first packing structure. The area occupancy of active material $V_A$ is determined by dividing the total area of the four circles (active material $V_A$) by the area of the rectangle that outlines the first packing structure. In other words, the below-described calculation gives the volume fraction as 78.5%. Hence, when the volume fraction of the active material is less than 78.5%, it is also conceivable that a void may be formed between active materials $V_A$ into which second solid electrolyte $V_2$ can enter. It should be noted that the area occupancy of the electrically-conductive material and the binder is regarded as negligible, as compared to active material $V_A$ and the like.

$$(\text{Volume fraction of active material}) = (4 \cdot \pi r_A^2)/(2r_A)^2 = (\pi/4) = 0.785$$

(Second Packing Structure)

FIG. 4 is a conceptual view of the second packing structure. The second packing structure also includes active material $V_A$, first solid electrolyte $V_1$, and second solid electrolyte $V_2$. Active material $V_A$ and first solid electrolyte $V_1$ are in particle form. In FIG. 4, part of second solid electrolyte $V_2$ is illustrated as a particle (see the broken-line circle in FIG. 4). The rest of second solid electrolyte $V_2$ is illustrated as contiguous phases for the sake of convenience. The second packing structure is different from the first packing structure in that the former has an ion conduction path(s) (second solid electrolyte $V_2$) extending in the X-axis direction and in the Y-axis direction.

The second packing structure satisfies the above expression (2). First solid electrolyte $V_1$ extends in the Z-axis direction, like a main stem. Second solid electrolyte $V_2$ fills the void formed between active materials $V_A$. As a result, second solid electrolyte $V_2$ extends like branches in the X-axis direction and in the Y-axis direction. Thus, the ion conduction path(s) is connected three-dimensionally. The ion conduction path(s) may form a three-dimensional network structure.

In the second packing structure, a second isosceles right triangle Δ2 can be drawn. Based on the Pythagorean theorem, second isosceles right triangle Δ2 may satisfy the relationship of the equation "$2^{0.5}(r_1 + r_A) = 2r_A + 2r_2$".

For example, when the volume fraction of the active material is 60%, the relationship of the equation "$0.6 = (4 \cdot \pi r_A^2)/(2r_A + 2r_2 + 2r_A)^2$" may be satisfied. From this, the relationship of the equation "$0.29r_A = r_2$" may be derived. Further, when the equation "$0.29r_A = r_2$" is substituted into the equation "$2^{0.5}(r_1 + r_A) = 2r_A + 2r_2$", the relationship of the equation "$r_1 = 0.83r_A$" may be derived. Based on these results, when the relationships of the following expressions (3) and (4) are satisfied, it is conceivable that formation of an ion conduction path(s) having a thick main stem and connected three-dimensionally is facilitated.

$$r_1 \leq 0.83r_A \quad (3)$$

$$0 < r_2 \leq 0.29r_A \quad (4)$$

For example, when the volume fraction of the active material is 70% in the second packing structure, from the same calculation as above, the relationships of the equation "$r_2 = 0.12r_A$" and the equation "$r_1 = 0.59r_A$" may be derived. Further, in the first packing structure (FIG. 1), the volume fraction of the active material is 78.5%. It is conceivable that, between active materials $V_A$ in FIG. 1, the relationship of the equation "$r_2 = 0$" is satisfied. Hence, $r_1$ may be from $0.59r_A$ to $0.83r_A$, for example. $r_2$ may be from $0.12r_A$ to $0.29r_A$, for example. The volume fraction of the active material may be from 60 to 70%, or from 70 to 78.5% (not less than 70% and less than 78.5%), for example.

<Production Method>

Figure 5:
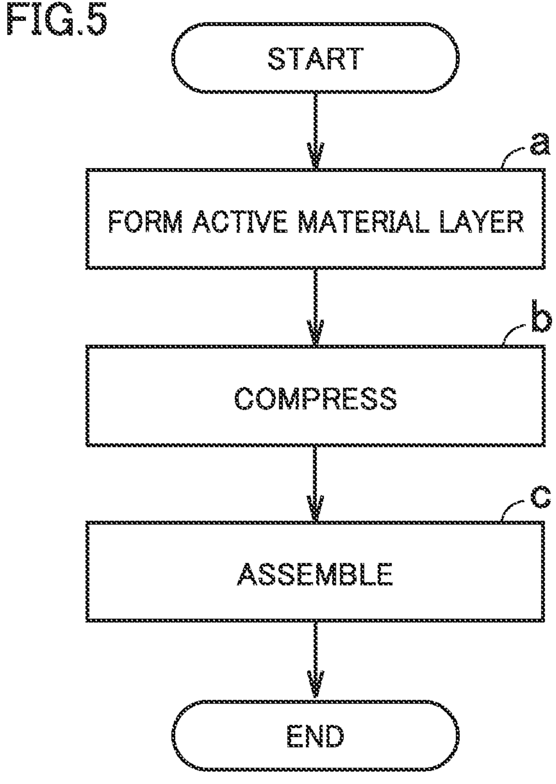
FIG. 5 is a schematic flowchart illustrating a production method according to the present embodiment.

FIG. 5 is a schematic flowchart illustrating a production method according to the present embodiment. Hereinafter, the production method according to the present embodiment is simply called "the present production method". The present production method includes "a method of producing an electrode for an all-solid-state battery" and "a method of producing an all-solid-state battery". The method of producing an electrode for an all-solid-state battery includes "(a) forming an active material layer" and "(b) compressing". The method of producing an all-solid-state battery includes "(a) forming an active material layer", "(b) compressing", and "(c) assembling".

<<(a) Forming Active Material Layer>>

The present production method includes forming an active material layer that includes an active material, a first solid electrolyte, and a second solid electrolyte. For example, an active material, a first solid electrolyte, a second solid electrolyte, an electrically-conductive material, a binder, and a dispersion medium may be mixed to form a slurry. As the dispersion medium, a liquid that is suitable for the types of the solid electrolyte, the binder, and the like may be selected, for example. The dispersion medium may include tetralin, butyl butyrate, N-methyl-2-pyrrolidone (NMP), water, and/or the like, for example.

The slurry is applied to the surface of a current collector to form a coating film. The resulting coating film may be dried to form an active material layer. In the present production method, any application apparatus and any drying apparatus may be used. For example, a die coater, a roll coater, a blade film applicator, a hot dryer, a hot plate, an infrared dryer, and/or the like may be used.

<<(b) Compressing>>

The present production method includes compressing the active material layer to produce an electrode. For example, a roll press may be used to compress the active material layer and the current collector. As a result of compressing the active material layer, compressive stress is generated within the active material layer. In the present production method, compressive stress is adjusted in consideration of the stress-strain curves of the materials.

The active material, the first solid electrolyte, and the second solid electrolyte satisfy the relationship of the above expression (1). That is, the compressive elastic modulus of the first solid electrolyte ($G_1$) is more than the compressive elastic modulus of the second solid electrolyte ($G_2$). On the stress-strain curves (FIG. 1), the elastic limit of the first solid electrolyte ($P_{y1}$) is more than the elastic limit of the second solid electrolyte ($P_{y2}$). In the present production method, pressing is carried out in such a manner that the compressive stress becomes more than the elastic limit of the second solid electrolyte ($P_{y2}$) and the compressive stress is not more than the elastic limit of the first solid electrolyte ($P_{y1}$). That is, the compressive stress is within the elastic region of the first solid electrolyte and within the plastic region of the second solid electrolyte. Hence, the first solid electrolyte is capable of elastically deforming. In addition, the second solid electrolyte is capable of plastically deforming. As a result, it is expected that an ion conduction path(s) can be connected three-dimensionally.

The elastic limit of the first solid electrolyte ($P_{y1}$) may be from 100 to 900 MPa, or from 300 to 800 MPa, or from 400 to 600 MPa, for example. The elastic limit of the second solid electrolyte ($P_{y2}$) may be from 1 to 100 MPa, or from 10 to 100 MPa, or from 50 to 100 MPa, for example. The elastic limit of the active material ($P_{ya}$) may be from 0.6 to 2 GPa, or from 0.8 to 1.5 GPa, or from 1 to 1.5 GPa, for example.

Pressing may be carried out in such a manner that, in the active material layer after the compressing, the active material, the first solid electrolyte, and the second solid electrolyte satisfy the relationships of the above expressions (2) to (4). With the relationships of (2) to (4) being satisfied, formation of an ion conduction path(s) that is connected three-dimensionally is expected to be facilitated.

<<(c) Assembling>>

The present production method includes producing an all-solid-state battery that includes the electrode thus obtained in the above manner. For example, a positive electrode and a negative electrode are stacked alternately with a separator layer interposed therebetween, and thereby a power generation element may be formed. The separator layer may be formed by applying a slurry to the surface of a substrate, for example. The separator layer and the electrode may be bonded to each other by transfer work, press-adhesion work, and/or the like, for example. To the power generation element, an external terminal is mounted. The resulting power generation element is accommodated into an exterior package, and thereby an all-solid-state battery may be completed.

What is claimed is:

1. An electrode for an all-solid-state battery, comprising: an active material layer, wherein the active material layer includes an active material, a first solid electrolyte, and a second solid electrolyte, the active material, the first solid electrolyte, and the second solid electrolyte satisfy a relationship of the following expression (1):

$$G_2 < G_1 < G_A \quad (1)$$

where $G_A$ represents a compressive elastic modulus of the active material, $G_1$ represents a compressive elastic modulus of the first solid electrolyte, and $G_2$ represents a compressive elastic modulus of the second solid electrolyte, and, further, the active material and the first solid electrolyte satisfy a relationship of the following expression (2):

$$0.41 r_A < r_1 \quad (2)$$

where $r_A$ represents a particle radius of the active material, and $r_1$ represents a particle radius of the first solid electrolyte.

2. The electrode for an all-solid-state battery according to claim 1, wherein the active material and the first solid electrolyte further satisfy a relationship of the following expression (3):

$$r_1 \leq 0.83 r_A \quad (3).$$

3. The electrode for an all-solid-state battery according to claim 1, wherein the active material and the second solid electrolyte further satisfy a relationship of the following expression (4):

$$0 < r_2 \leq 0.29 r_A \quad (4)$$

where $r_A$ represents a particle radius of the active material, and $r_2$ represents a particle radius of the second solid electrolyte.

4. The electrode for an all-solid-state battery according to any claim 1, wherein a volume fraction of the active material in the active material layer is 60% or more.

5. An all-solid-state battery comprising the electrode for an all-solid-state battery according to claim 1.

6. A method of producing an electrode for an all-solid-state battery, the method comprising:

(a) forming an active material layer including an active material, a first solid electrolyte, and a second solid electrolyte; and (b) compressing the active material layer to produce an electrode for an all-solid-state battery, where the active material, the first solid electrolyte, and the second solid electrolyte satisfy a relationship of the following expression (1):

$$G_2 < G_1 < G_A \quad (1)$$

where $G_A$ represents a compressive elastic modulus of the active material, $G_1$ represents a compressive elastic modulus of the first solid electrolyte, and $G_2$ represents a compressive elastic modulus of the second solid electrolyte, in (b) above, compressive stress is generated within the active material layer, the compressive stress is within an elastic region of a stress-strain curve of the first solid electrolyte, and the compressive stress is within a plastic region of a stress-strain curve of the second solid electrolyte.

7. The method of producing an electrode for an all-solid-state battery according to claim 6, wherein in the active material layer after the compressing, the active material, the first solid electrolyte, and the second solid electrolyte satisfy relationships of expressions (2), (3), and (4):

$$0.41r_A<r_1 \quad (2)$$

$$r_1 \leq 0.83r_A \quad (3)$$

$$0<r_2 \leq 0.29r_A \quad (4)$$

where $r_A$ represents a particle radius of the active material, $r_1$ represents a particle radius of the first solid electrolyte, and $r_2$ represents a particle radius of the second solid electrolyte.

* * * * *